US012350222B2

(12) United States Patent
Curley

(10) Patent No.: US 12,350,222 B2
(45) Date of Patent: Jul. 8, 2025

(54) MASSAGE GUN ATTACHMENT AND METHOD

(71) Applicant: Charles M Curley, Cortland, NY (US)

(72) Inventor: Charles M Curley, Cortland, NY (US)

( * ) Notice: Subject to any disclaimer, the term of this patent is extended or adjusted under 35 U.S.C. 154(b) by 716 days.

(21) Appl. No.: 17/488,831

(22) Filed: Sep. 29, 2021

(65) Prior Publication Data

US 2022/0160578 A1 May 26, 2022

Related U.S. Application Data

(60) Provisional application No. 63/118,604, filed on Nov. 25, 2020.

(51) Int. Cl.
*A61H 23/00* (2006.01)
*A61H 15/00* (2006.01)
*A61H 23/02* (2006.01)

(52) U.S. Cl.
CPC ....... *A61H 23/006* (2013.01); *A61H 15/0085* (2013.01); *A61H 23/02* (2013.01); *A61H 2015/0021* (2013.01); *A61H 2201/0153* (2013.01); *A61H 2201/1685* (2013.01); *A61H 2201/169* (2013.01); *A61H 2201/5058* (2013.01)

(58) Field of Classification Search
CPC ....... A61H 1/006; A61H 1/008; A61H 23/006
USPC ................................. 601/107; D24/214–215
See application file for complete search history.

(56) References Cited

U.S. PATENT DOCUMENTS 3,626,934 A 12/1971 Andis
4,150,668 A 4/1979 Johnston
4,173,217 A 11/1979 Johnston
4,549,535 A 10/1985 Wing
4,566,442 A 1/1986 Mabuchi et al.
4,730,605 A 3/1988 Noble et al.
5,085,207 A 2/1992 Fiore
5,417,644 A 5/1995 Lee
5,569,168 A 10/1996 Hartwig
5,573,500 A 11/1996 Katsunuma et al.
5,951,501 A 9/1999 Griner
6,228,042 B1 5/2001 Dungan
6,537,236 B2 3/2003 Tucek et al.
D478,385 S 8/2003 Dirks et al.
6,663,657 B1 12/2003 Miller
6,682,496 B1 1/2004 Pivaroff
(Continued)

FOREIGN PATENT DOCUMENTS

AU 2020202233 B2 6/2020
CN 101035496 B * 5/2010 ............ A61H 1/008
(Continued)

OTHER PUBLICATIONS

Translation of CN 101035496. (Year: 2010).*
Translation of JP 2019093145-A. (Year: 2019).*

*Primary Examiner* — Valerie L Woodward
*Assistant Examiner* — Paige Kathleen Bugg
(74) *Attorney, Agent, or Firm* — Chris Tanner; FYPA PLLC

(57) ABSTRACT

An accessory for a massage gun which aids the user in holding the massage gun steady while focusing on a target muscle without requiring two hands as well as reduces user fatigue while focusing on a target muscle for longer periods of time. The accessory of the embodiments of the present invention is light weight and easily attachable and detachable to a massage gun.

9 Claims, 11 Drawing Sheets

(56) References Cited

U.S. PATENT DOCUMENTS

| | | | | |
|---|---|---|---|---|
| 6,758,826 | B2 * | 7/2004 | Luettgen | A61H 23/0254 601/72 |
| 7,169,169 | B2 | 1/2007 | Tucek et al. | |
| D553,252 | S | 10/2007 | Masuda | |
| D556,913 | S | 12/2007 | Laituri | |
| D609,817 | S | 2/2010 | Piller et al. | |
| 7,927,259 | B1 | 4/2011 | Rix | |
| 8,083,699 | B2 | 12/2011 | Colloca et al. | |
| D659,843 | S | 5/2012 | Wang | |
| 8,342,187 | B2 | 1/2013 | Kalman et al. | |
| D684,723 | S | 6/2013 | Tsai | |
| D696,786 | S | 12/2013 | Bradford | |
| D703,825 | S | 4/2014 | Barrett | |
| 8,777,881 | B2 | 7/2014 | Tsai | |
| 8,951,216 | B2 | 2/2015 | Yoo et al. | |
| D734,863 | S | 7/2015 | Hennessey | |
| 9,265,689 | B2 | 2/2016 | Stanbridge | |
| 9,272,141 | B2 | 3/2016 | Nichols | |
| 9,289,348 | B2 | 3/2016 | Kanbar et al. | |
| 9,345,633 | B2 | 5/2016 | Fuhr et al. | |
| 9,687,416 | B2 | 6/2017 | Turner | |
| 9,889,066 | B2 | 2/2018 | Danby et al. | |
| 10,016,337 | B2 | 7/2018 | Roberts | |
| D826,418 | S | 8/2018 | Lad | |
| D840,547 | S | 2/2019 | Harle et al. | |
| D847,364 | S | 4/2019 | Lee et al. | |
| 10,252,051 | B2 | 4/2019 | Nichols | |
| 10,314,762 | B1 | 6/2019 | Marton et al. | |
| 10,357,425 | B2 | 7/2019 | Wersland et al. | |
| D855,822 | S | 8/2019 | Marton et al. | |
| D863,571 | S | 10/2019 | Yang | |
| 10,470,970 | B2 | 11/2019 | Nazarian et al. | |
| D872,869 | S | 1/2020 | Lu | |
| D873,432 | S | 1/2020 | Duan | |
| D874,015 | S | 1/2020 | Marton et al. | |
| D875,961 | S | 2/2020 | Li | |
| D879,985 | S | 3/2020 | Wersland et al. | |
| D879,986 | S | 3/2020 | Wersland et al. | |
| D880,714 | S | 4/2020 | Wersland et al. | |
| D880,715 | S | 4/2020 | Wersland et al. | |
| D880,716 | S | 4/2020 | Wersland et al. | |
| D884,205 | S | 5/2020 | Zhuang | |
| D884,207 | S | 5/2020 | Ma | |
| D884,915 | S | 5/2020 | Wersland et al. | |
| 10,661,072 | B2 | 5/2020 | Kern et al. | |
| D887,573 | S | 6/2020 | Wersland et al. | |
| 10,702,448 | B2 | 7/2020 | Wersland et al. | |
| D893,738 | S | 8/2020 | Zhuang | |
| D895,132 | S | 9/2020 | Hu | |
| D895,133 | S | 9/2020 | Xu | |
| D895,135 | S | 9/2020 | Xu | |
| D895,829 | S | 9/2020 | Hu | |
| D895,831 | S | 9/2020 | Chen | |
| D896,396 | S | 9/2020 | Wersland et al. | |
| 10,758,452 | B2 | 9/2020 | Wersland et al. | |
| D897,946 | S | 10/2020 | Liu | |
| D898,209 | S | 10/2020 | Xu | |
| D898,933 | S | 10/2020 | Xu | |
| D899,620 | S | 10/2020 | Huang | |
| 10,806,660 | B1 | 10/2020 | Smith, Jr. et al. | |
| 10,842,703 | B2 | 11/2020 | Zhang | |
| 10,847,984 | B2 | 11/2020 | Solana et al. | |
| D905,863 | S | 12/2020 | Lin | |
| D906,533 | S | 12/2020 | Xu | |
| 10,857,064 | B2 * | 12/2020 | Wersland | A61H 23/006 |
| D907,229 | S | 1/2021 | Zhang | |
| D907,230 | S | 1/2021 | Zhang | |
| D908,908 | S | 1/2021 | Xu | |
| 10,888,492 | B2 | 1/2021 | Marton et al. | |
| D911,535 | S | 2/2021 | Yu | |
| 10,905,621 | B2 | 2/2021 | Maichel et al. | |
| 10,905,627 | B2 | 2/2021 | Marton et al. | |
| D912,267 | S | 3/2021 | Tang | |
| 10,959,908 | B2 | 3/2021 | Lee et al. | |
| D918,408 | S | 5/2021 | Huang | |
| D918,411 | S | 5/2021 | Xu | |
| D920,531 | S | 5/2021 | Xu | |
| D921,215 | S | 6/2021 | Xu | |
| D921,914 | S | 6/2021 | Wersland et al. | |
| D923,188 | S | 6/2021 | Xu | |
| D923,190 | S | 6/2021 | Xu | |
| D923,194 | S | 6/2021 | Xu | |
| D925,751 | S | 7/2021 | Wu | |
| D925,756 | S | 7/2021 | Xu | |
| D925,758 | S | 7/2021 | Xu | |
| D958,389 | S | 7/2022 | Minkus | |
| 11,723,830 | B1 * | 8/2023 | Marton | A61H 23/006 601/108 |
| 11,819,296 | B1 | 11/2023 | Silver | |
| 2008/0125680 | A1 * | 5/2008 | Richmond | A61H 23/0263 601/72 |
| 2012/0209156 | A1 * | 8/2012 | Leismer | A61H 1/024 601/49 |
| 2017/0304145 | A1 * | 10/2017 | Pepe | A61H 23/02 |
| 2019/0083354 | A1 | 3/2019 | Pahl | |
| 2019/0350793 | A1 | 11/2019 | Wersland et al. | |
| 2020/0261306 | A1 * | 8/2020 | Pepe | A61H 23/006 |
| 2021/0219999 | A1 * | 7/2021 | Hoffman | A61H 23/0254 |
| 2021/0244609 | A1 | 8/2021 | Lee et al. | |
| 2021/0322257 | A1 | 10/2021 | Lee et al. | |
| 2021/0361519 | A1 | 11/2021 | Hagy | |
| 2022/0015988 | A1 | 1/2022 | Williams | |
| 2022/0079836 | A1 * | 3/2022 | Heltsley | A61H 15/0085 |
| 2022/0117841 | A1 * | 4/2022 | Tellam | A61H 37/00 |
| 2022/0354735 | A1 * | 11/2022 | Curley | A61H 23/006 |

FOREIGN PATENT DOCUMENTS

| | | | | |
|---|---|---|---|---|
| CN | 206880835 | U | 1/2018 | |
| CN | 107822844 | A | 3/2018 | |
| CN | 208525375 | U | 2/2019 | |
| CN | 109907965 | A | 6/2019 | |
| CN | 106137709 | B | 7/2019 | |
| CN | 211157196 | U | 8/2020 | |
| CN | 212854024 | U | 4/2021 | |
| DE | 202015104519 | U1 | 9/2015 | |
| DE | 202021101048 | U | 3/2021 | |
| JP | 2016120107 | A | 7/2016 | |
| JP | 2019093145 | A * | 6/2019 | A61H 1/00 |
| JP | 6640719 | B2 | 2/2020 | |
| JP | 6720253 | B2 | 7/2020 | |
| JP | 3228625 | U | 11/2020 | |
| KR | 101123926 | B1 | 4/2012 | |
| KR | 20190000098 | U | 1/2019 | |
| KR | 20190021343 | A | 3/2019 | |
| WO | 2014054450 | A1 | 4/2014 | |
| WO | 2015038005 | A2 | 3/2015 | |
| WO | 2020227520 | A1 | 11/2020 | |

* cited by examiner

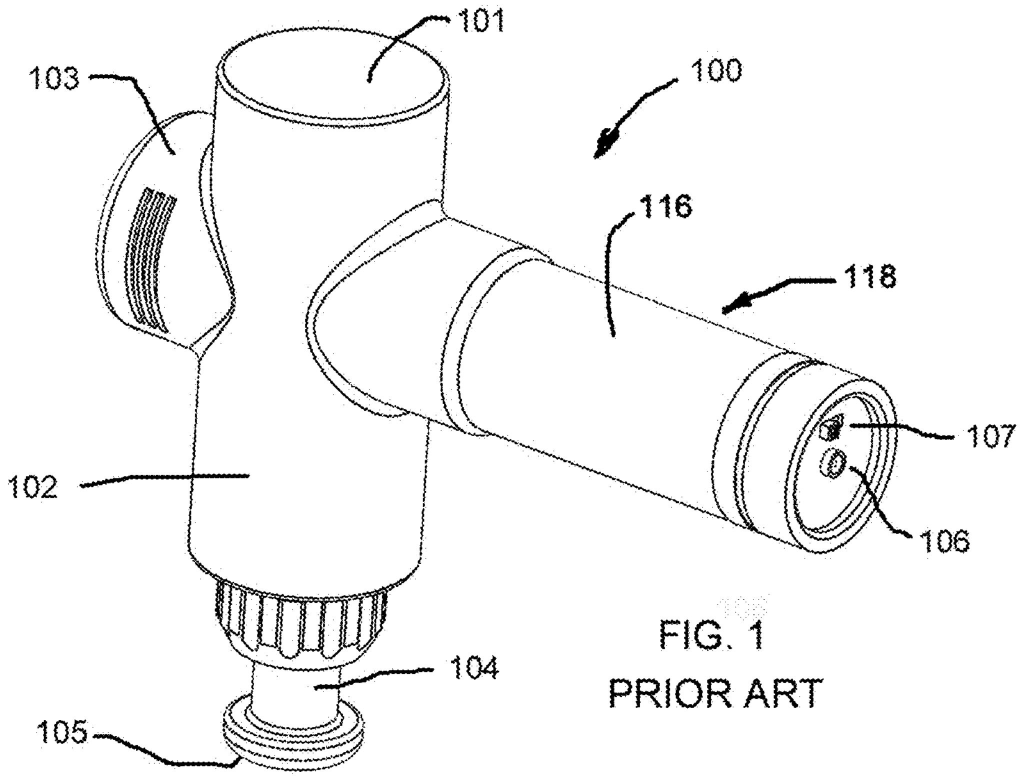
FIG. 1
PRIOR ART
FIG. 2
PRIOR ART
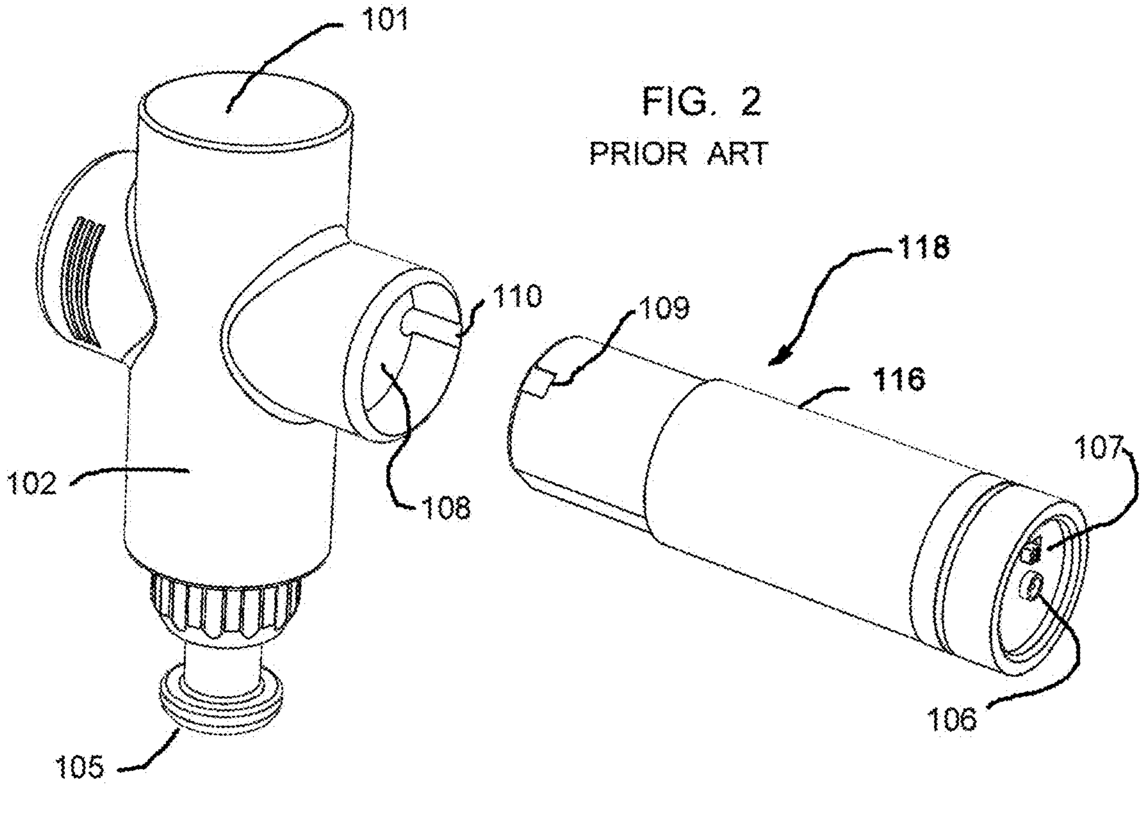

PRIOR
ART

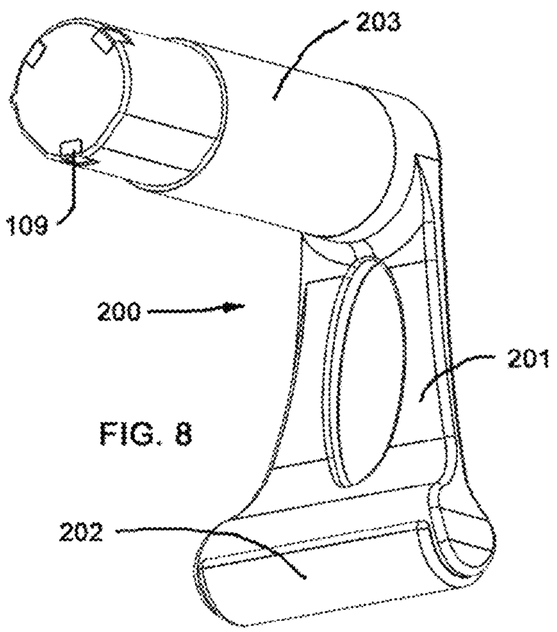
FIG. 8
FIG. 9
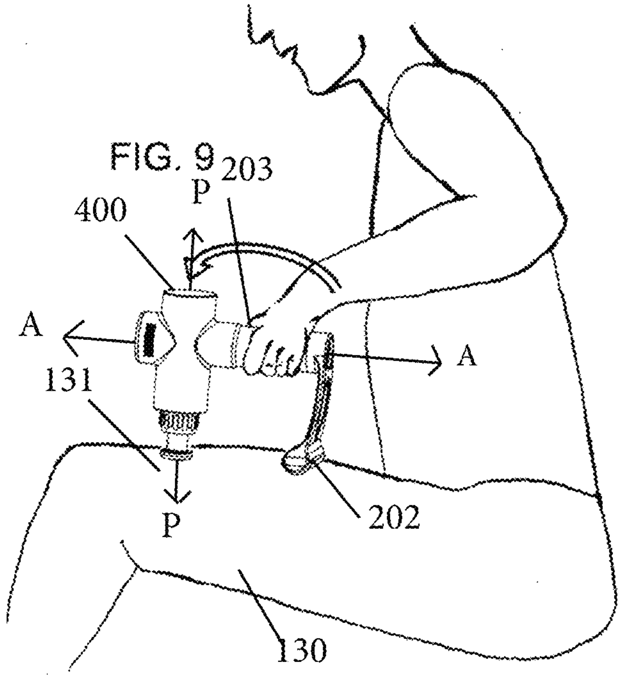

MASSAGE GUN ATTACHMENT AND METHOD

CROSS-REFERENCE TO RELATED APPLICATIONS

This application claims one or more inventions which were disclosed in Provisional Application No. 63/118,604 filed Nov. 25, 2020, entitled "MASSAGE GUN ATTACHMENT AND METHOD". The benefit under 35 USC § 119(e) of the United States provisional application is hereby claimed, and the aforementioned application is hereby incorporated herein by reference.

BACKGROUND

The invention herein is in the field of percussive massage devices that apply vibratory massage impulses to selected muscle groups of the human body.

Percussive massage is the process of using rapid repeated impulses of short duration to specific muscle groups of the human body. While originally performed with the human hands of massage therapists, tools called "massage guns" have more recently become available to perform this type of massage therapy. Massage guns are handheld electromechanical devices which provide repeating mechanical impulses to an impulse head that is pressed against specific areas of the human body. The user holds the impulse head against an area of the body and the motorized device causes the head to rapidly vibrate with various forces and frequencies which are adjustable by the user. Common massage gun heads are shaped like spheres, cups and forks, which are usually provided as exchangeable attachments that snap into the vibrating end of the massage gun.

Massage guns are said to treat sore muscles after exercise, to increase blood circulation, to relieve muscle stiffness, to increase range of joint movement and to reduce inflammatory muscle reaction. These devices usually possess controls which allow the user to adjust the frequency of the vibratory impulses. An example of a battery powered massage gun configuration is shown in the prior art illustrations of FIGS. 1-3 which are similar to that described in U.S. Pat. No. 10,561,574. Other similar configurations are shown by Taiwan Utility Model No. TW543692 and Chinese Utility Model No. CN210844173U. Many other similar configurations are on the market where the detachable battery housing functions in the dual roles of securely storing the battery and acting as the "pistol handle" for grasping the device.

FIG. 1 shows a common configuration of a prior art percussive massage gun 100. A percussive massage head 105 with a spherical shape is mounted on the end of a piston 104 that reciprocates in the direction of the axis of the body 102 of the housing 101 to create a vibratory impulsive movement. The main housing 101 has a cylindrical extension 103 which houses a battery-driven motor. A removable battery assembly 118 includes an opposing cylindrical extension 116. The cylindrical battery assembly 118 has the dual functions of housing the battery and also acting as the handle for the massage gun 100. The user grasps the cylindrical extension 116 in a way similar to grasping a pistol, and then presses the massage head 105 against the target muscle or tissue of the human body. The vibration is initiated by engaging the "ON" switch 107 which is located on the distal end of the battery assembly 118.

FIG. 2 shows the percussive massage gun 100 with the battery assembly 118 removed from the main body 102. The receiving cavity 108 of the main body 102 contains a latch (not shown) which allows the battery assembly 118 to be inserted and secured into the receiving cavity 108. Battery contacts 109 mate with receiving contacts within the cavity 108 in order to provide voltage for the motor. The cavity 108 additionally contains a guide rail 110 which prevents the battery assembly 118 from rotating within the cavity 108. The detachable battery feature allows one battery assembly to be charging while another is being utilized in the massage gun. Charging of the battery is accomplished by inserting a charger into charging port 106.

An exploded view of the battery assembly 118 components is shown in FIG. 3. The battery pack 120 is contained within a shell consisting of molded plastic housing halves 111, 112. An end cap 113 is used to mount the ON-OFF switch 107. The battery pack 120 may be composed of a single large lithium-ion battery or several smaller lithium-ion batteries connected in series. Rechargeable NiCad batteries could also be utilized. Between the end cap 113 and the housing 111 is a disk 115 including the electronics associated with the charging port 106. Between the disk 115 and the end cap 113 is a sealing ring 114.

The effectiveness of the massage gun depends upon the user's ability to hold the gun steady while applying pressure to the target muscle location. The vibratory action of the reciprocating head causes an equal reaction at the user's hand, which makes it difficult to hold the gun focused at the target location, especially at low oscillation speeds. The reaction of the user also causes fatigue when attempting to focus the gun in a specific location for a long period of time.

One solution for improving stability of the massage head over the muscle target is to use two hands to steady the massage gun as described in Chinese Published Application No. CN111084714A (referred to as CN'714) which discloses an ergonomically improved massage gun that uses two handles that are arranged in the shape of a Y, as shown in prior art FIG. 4. Prior art FIG. 5 is an excerpt from CN'714 which shows the Y-shaped massage gun being used on a person's back. CN'714 details that "two handles allow the therapist to massage with great force and the relatively large distance between the positions where the therapist grips the device makes the stability more pronounced so that the massager does not easily slide off its intended position and target site on the patient's body." CN'714 further states "[t]he device also allows for reduced fatigue in use, compared to various existing massagers, whether individual users or therapists."

SUMMARY

One embodiment of the invention herein is an attachment that takes the form of a battery housing with an extension that allows the user to stabilize the massage gun when applying pressure at the vibrating head. A focusing rest stabilizer snaps into the massage gun in the place of the original battery, using the same latch mechanism as used to secure the original battery assembly to the massage gun. The distal end of the focusing rest possesses a soft, high friction surface the helps to anchor and support the device while focusing the vibratory nose end on a specific body part.

In another embodiment of the invention, the focusing rest is designed to securely snap onto the original battery housing. In this embodiment, the attachment does not function as the battery for the massage gun.

Another aspect of the invention is the ability to make the massage gun self-standing. With the focusing rest attached, the massage gun stands in a position that is easily and more naturally graspable by the user.

Another aspect of the embodiments disclosed herein is a method of operating a percussive massage gun. The method allows the operator to use the device as a lever, so as to apply controllable rotational force against the vibrating end of the device.

Embodiments of the present invention aids the user in holding the gun steady while focusing on a target muscle without requiring two hands as well as reduces user fatigue while focusing on a target muscle for longer periods of time. The anatomy-conforming feature facilitates comfortable contact when used with muscle groups of the curvaceous type, such as arms, legs and buttocks. The accessory of the embodiments of the present invention is light weight and easily attachable and detachable to a massage gun.

BRIEF DESCRIPTION OF THE DRAWINGS

FIG. 1 shows is an illustration of a common prior art massage gun configuration.

FIG. 2 is an illustration of the prior art massage gun with the battery housing removed.

FIG. 8 is an alternate view of the focusing rest attachment.

FIG. 9 is an illustration showing the method of percussive massage when utilizing the focusing rest.

DETAILED DESCRIPTION

Figure 3:
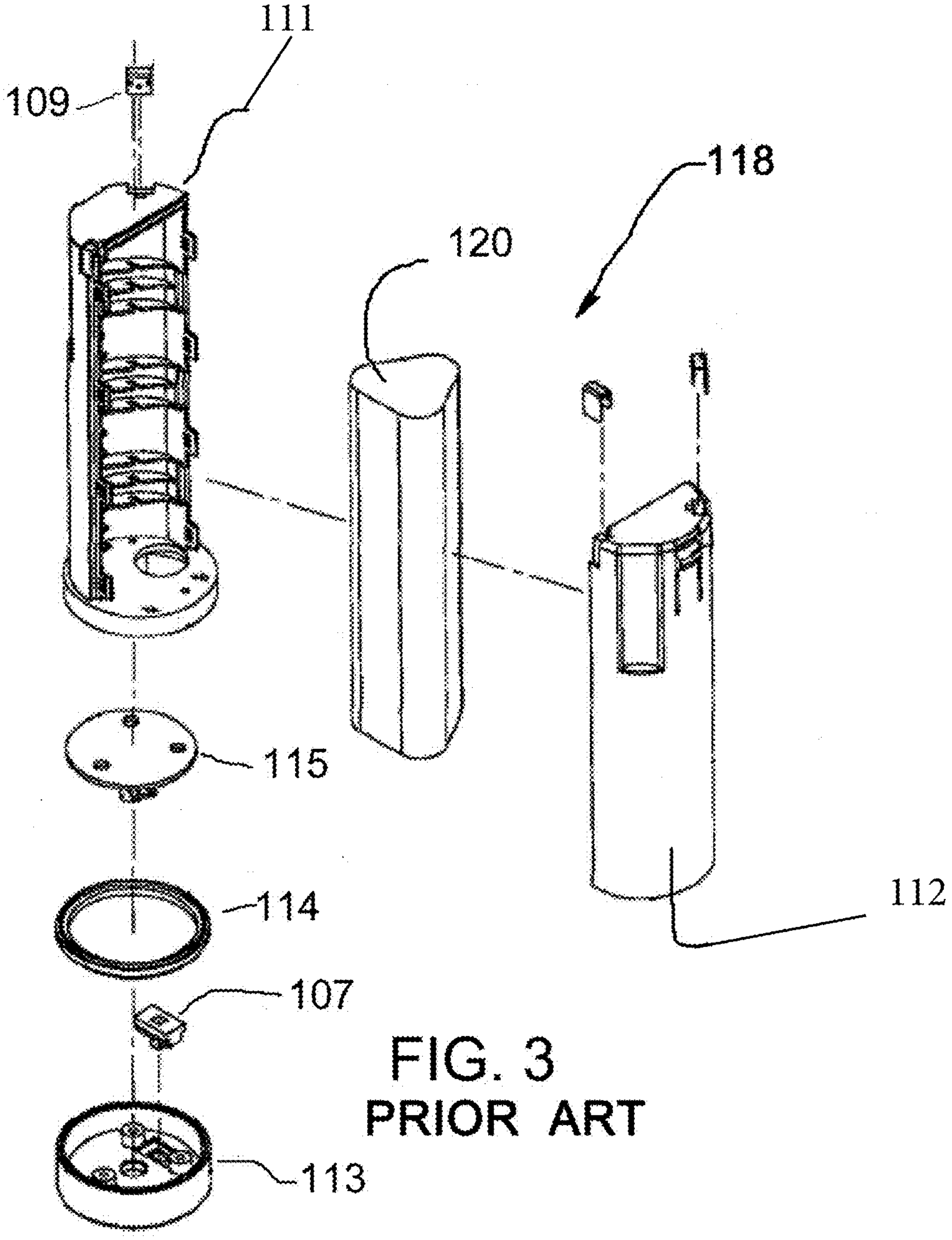
FIG. 3 PRIOR ART
FIG. 3 is an exploded view showing the construction of the prior art battery housing components.
Figure 4:
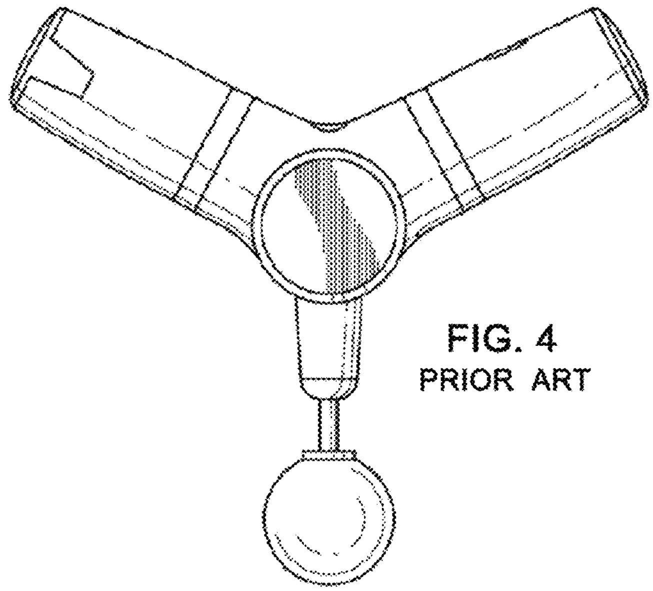
FIG. 4 PRIOR ART
FIG. 4 is an illustration of a prior art Y-shaped massage gun.
Figure 5:
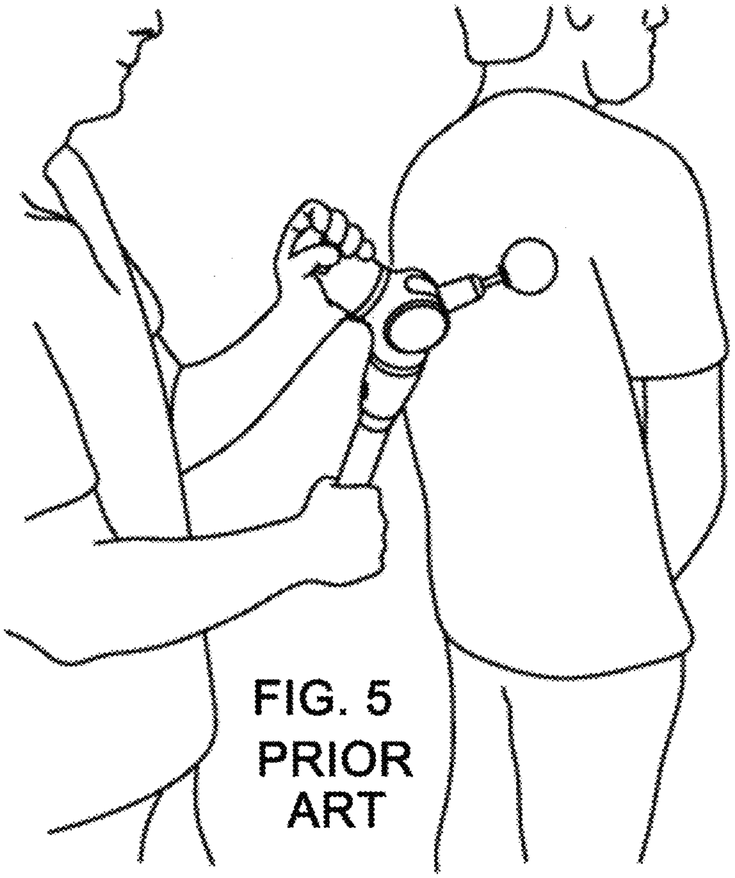
FIG. 5 is an illustration of a prior art Y-shaped massage gun in use on a person's back.
Figure 6:
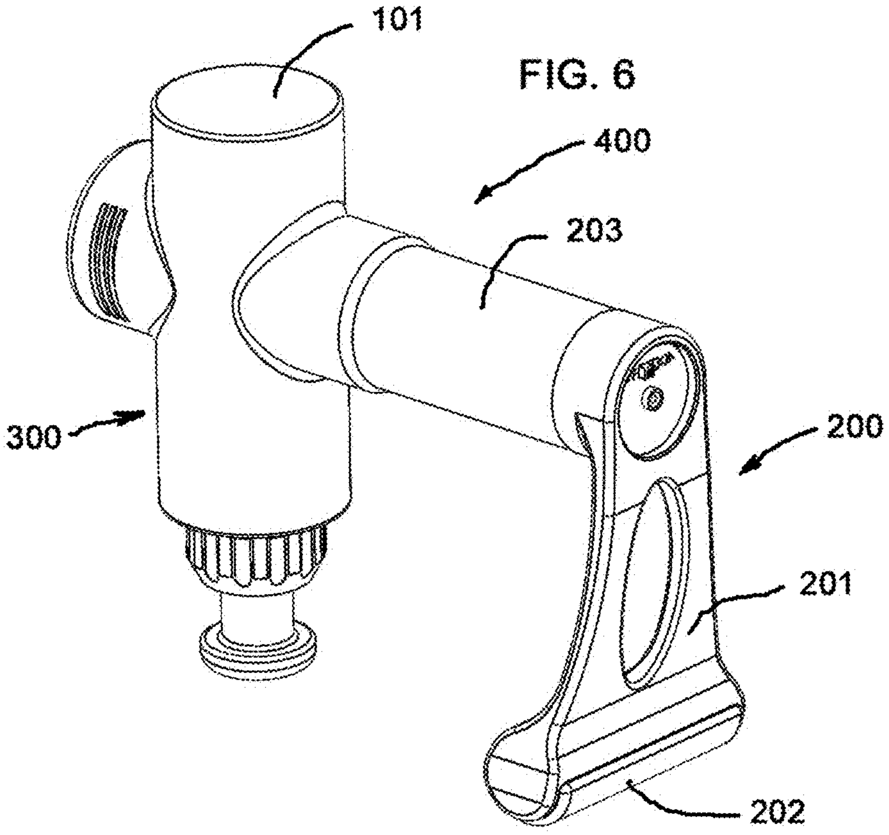
FIG. 6 is an illustration of the focusing rest attachment of an embodiment of the present invention.

FIG. 6 shows a compact stabilizing solution for a massage gun of an embodiment of the present invention. A focusing rest massage gun attachment 200 is shown attached to the main body 300 of the massage gun 400 that enables the user to hold the gun steady while focusing on a target muscle without requiring two hands. The focusing rest attachment 200 snaps into the massage gun cavity 108 in the place of the original battery assembly, using the same latch mechanism 110 as used to embrace the original battery assembly 118. In an alternate embodiment, the focusing rest attachment 200 may be made a non-detachable, permanent part of the main body 300 of the massage gun housing.

The focusing rest attachment 200 consists of a first portion 203 that forms a handle which is gripped by the user and includes the components of the original battery assembly 118. A second portion 201, extending approximately perpendicular to the first portion 203, forms an anchoring support surface for the massage gun 400. In this embodiment, the second portion 201 is sized so as to support the massage gun 400 in a position whereupon the axis A-A of the first portion 203 is approximately parallel to the surface being massaged (see FIG. 9). In other embodiments, the second portion 201 may be longer or shorter to create a different angular orientation of the first portion 203 relative to the second portion 201, such that the angle between the first portion 203 and the second portion 201 is greater than 90 degrees or less than 90 degrees. A cylindrical contact cushion surface 202 is located on the contact surface of the focusing rest, and is made from a soft conformable material such as foamed silicone rubber, which also has a high friction coefficient. The contact cushioned surface 202 may be formed by a process known as overmolding or may be attached to the second portion 201 by adhesives.

Figure 7:
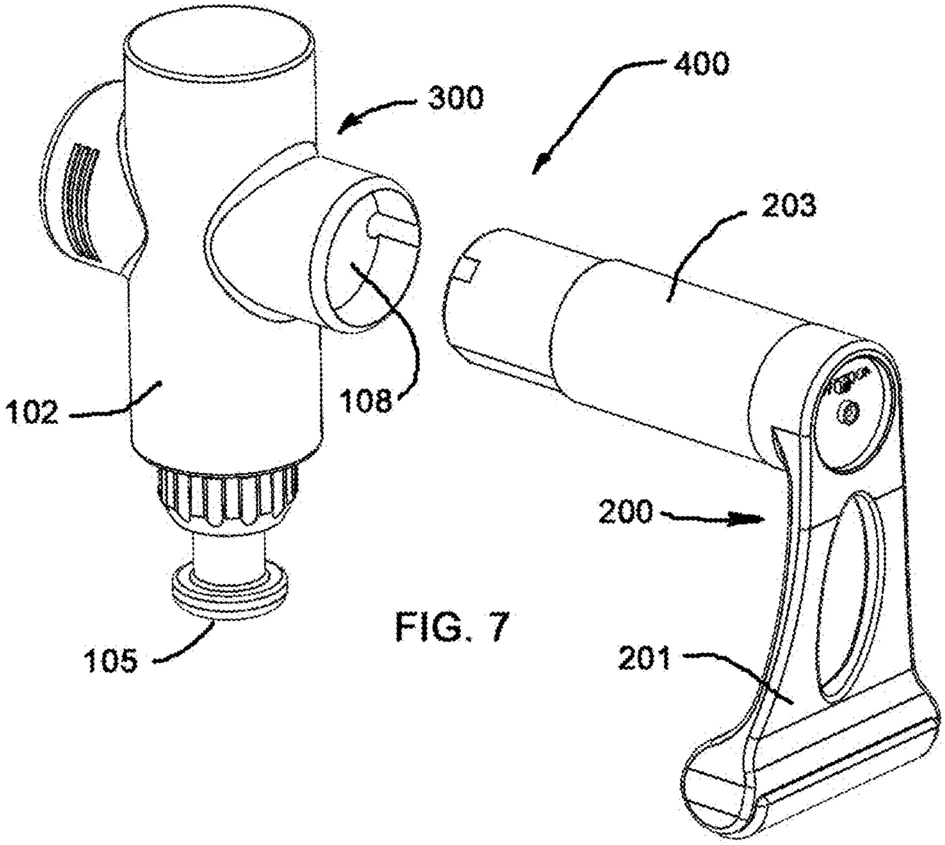
FIG. 7 is an illustration of a common massage gun with the focusing rest removed from the battery compartment cavity.

FIG. 7 is an illustration of the massage gun 400 with the focusing rest attachment 200 removed from the massage gun cavity 108. FIG. 8 is an alternate view of the focusing rest attachment 200 which shows the detail of the contact cushion surface 202 and the aesthetic shape of the molded plastic housing. The contact cushion surface 202 can be eliminated in a reduced-cost version of the focusing rest attachment 200.

The method of operating the massage gun is depicted in FIG. 9. The high friction contact cushion surface 202 is positioned onto the target limb 130 adjacent to the target muscle 131 such that the user can control the percussive pressure by rotational force. The contact cushion surface 202 of the focusing rest attachment 200 acts like the fulcrum of a lever, allowing the user to adjust massage pressure by leverage. The first portion 203 of the battery assembly is attached to the handheld massage gun 400 with the second portion 201 supporting the handheld massage gun 400 in a self-standing position, such that an axis P-P of a piston 104 of the handheld massage gun 400 is maintained approximately perpendicular to the first portion 203 of the battery assembly.

Figure 10:
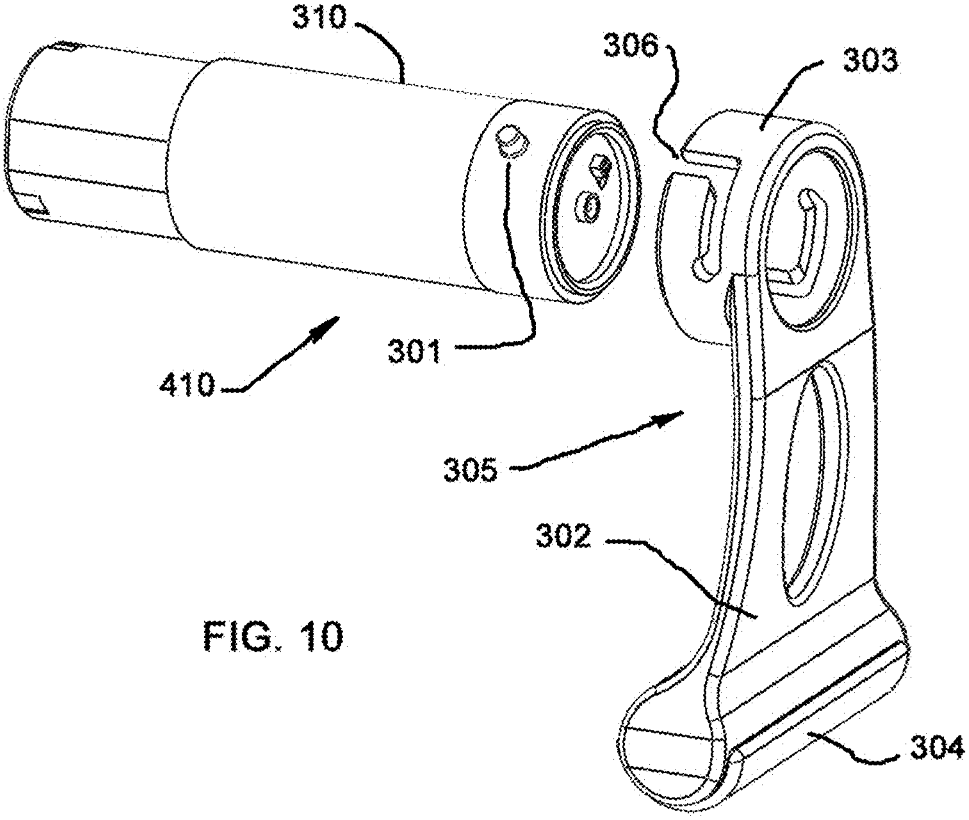
FIG. 10 is an illustration of an alternate embodiment of the focusing rest which attaches to the exterior surface of the battery assembly.

FIG. 10 shows an alternate embodiment of the focusing rest attachment. In this embodiment the focusing rest attachment 305 is not an integral part of the battery assembly 410.

Figure 11:
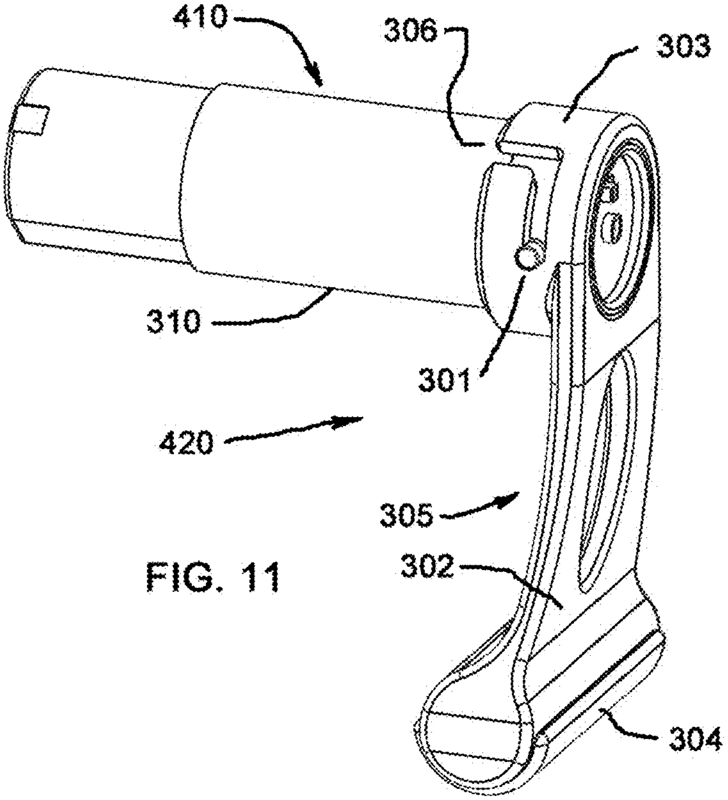
FIG. 11 is an illustration of an alternate design of the focusing rest when attached to the battery assembly.

The focusing rest attachment 305 has a first portion 303 which attaches to the battery assembly 410, and a second portion 302 which forms a structural support. In a preferred embodiment, the first portion 303 is attached to the battery assembly 410 by means of a bayonet mount as shown in the illustration. The battery assembly 410 possesses a pair of male projections 301 that mate and interlock with cam grooves 306 on the first portion 303 focusing rest attachment 305 by a twisting assembly motion. The resulting assembly 420 is shown in FIG. 11. The assembly 420 may then be attached to the massage gun main body 300 with the battery assembly latch 110. Rather than a bayonet mount, other rotational attachment methods could be used the attach the battery assembly 410 to the focusing rest attachment 305, such as screw threads or helical protrusions.

Figure 12:
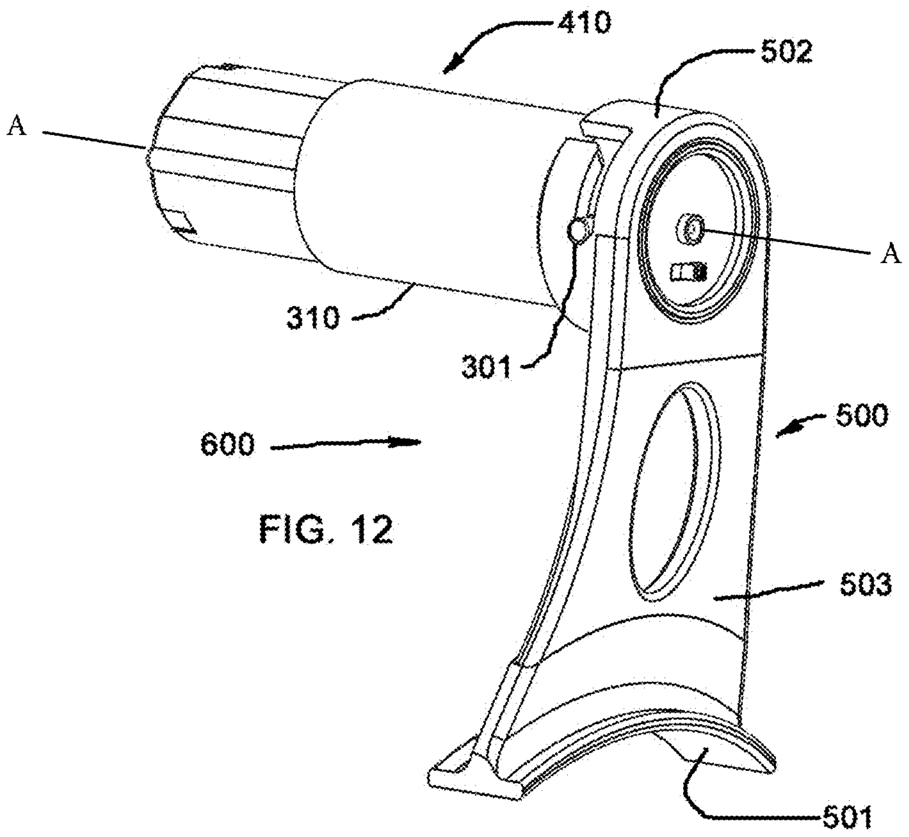
FIG. 12 is an illustration of an alternate design of the focusing rest which attaches to the exterior surface of the battery housing and possesses a curvilinear contact surface on its distal end.

An alternate design can be utilized for use on the smaller diameter limbs such as forearms, thighs or calves. The massage gun is made more comfortable for these applications if the contact surface of the focusing rest is made curvilinear. FIG. 12 shows an alternate attachment embodiment where the contact surface 501 of the focusing rest 500 is made concave to conform to the curvature of a specific muscle while orienting the axis A-A of the circular surface 310 of the battery assembly 410 parallel to that muscle group.

Figure 13:
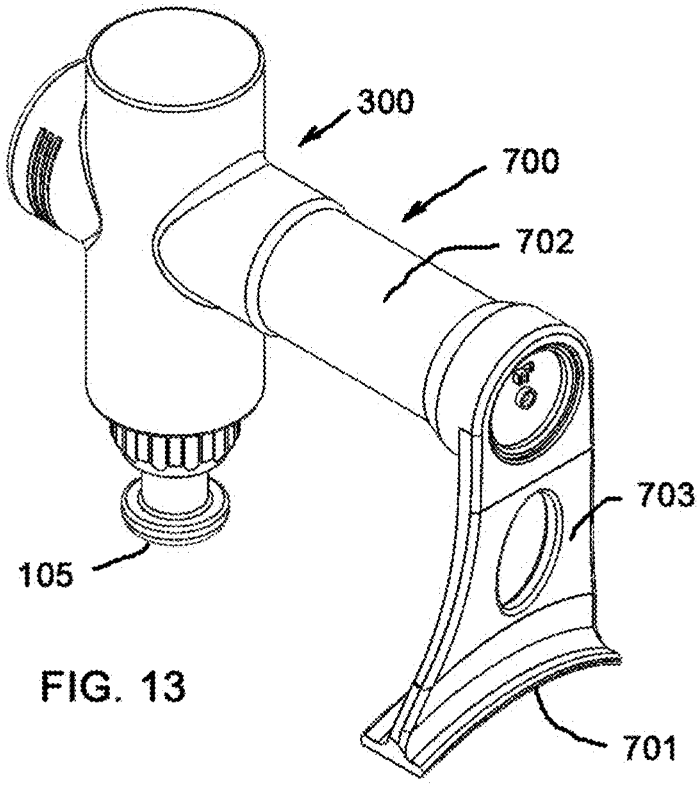
FIG. 13 is an illustration of the massage gun with a curvilinear focusing rest surface that is an integral part of the battery assembly housing.

FIG. 13 illustrates another massage gun embodiment where the curvilinear focusing rest surface 701 is an integral part of the battery assembly 700. The battery assembly 700 has a first portion 702 connected to a second portion 703. The curvilinear rest surface 701 contacts the curvilinear contour of muscles such as the thighs, biceps or calves.

Figure 14:
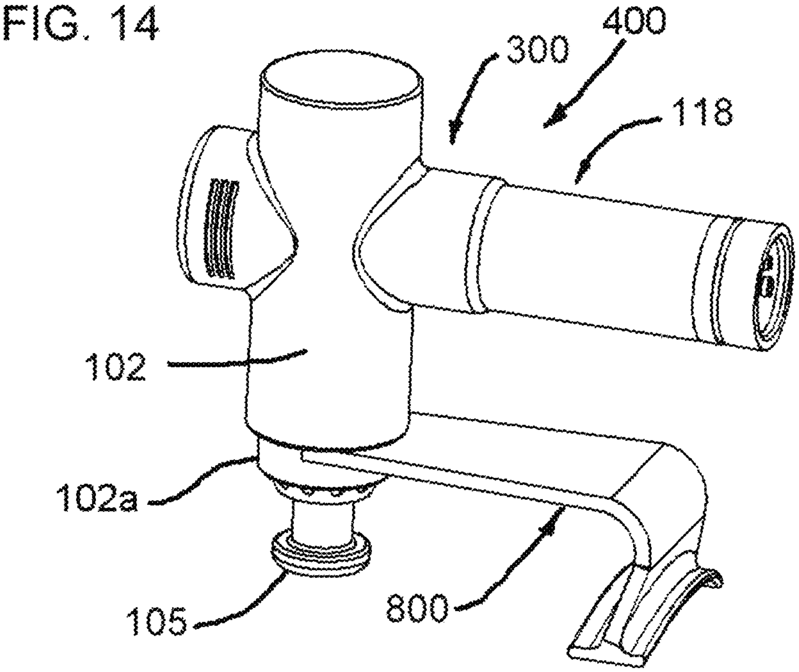
FIG. 14 is an isometric view of the massage gun whereupon a focusing attachment is mounted to the housing orthogonal to the axis of the reciprocating plunger.

FIG. 14 shows another embodiment which uses a curvilinear focusing rest surface similar to that taught in FIG. 13. The focusing rest 800 is shaped so as to mount to the body 102 of the main housing 101 of the massage gun 400 just below an end 102*a* of a circular section of the main body 102. The original battery housing design 118 is undisturbed in this embodiment. The focusing rest 800 may mount to the end 102*a* of the circular section of the body 102 of the housing 101 of the massage gun 400 using any of the attachment methods explained above for the attachment of FIGS. 10 through 12.

Figure 15:
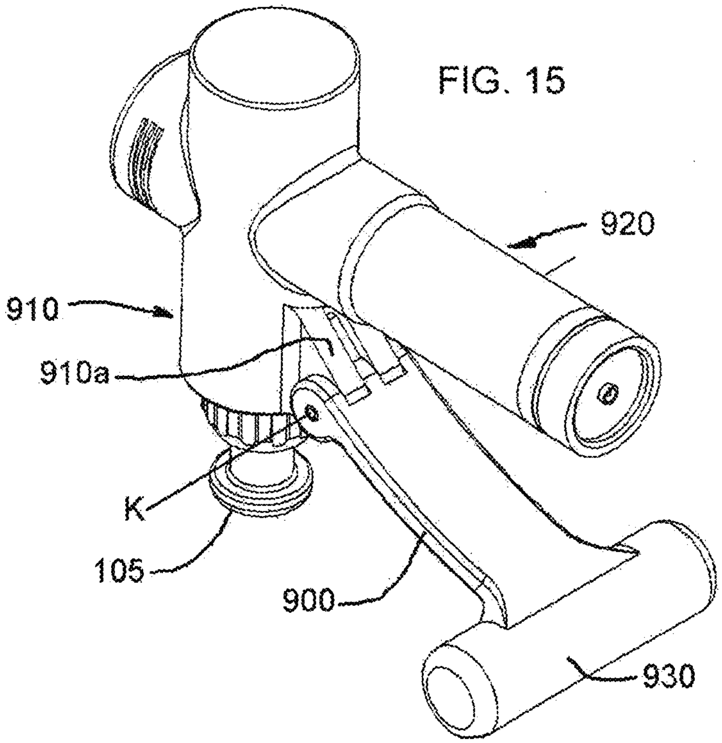
FIG. 15 is an isometric view of a massage gun whereupon the focusing attachment is mounted on axis K which allows the focusing rest to pivot through a minor movement upon the axis K which is orthogonal to the movement of the plunger.
Figure 16:
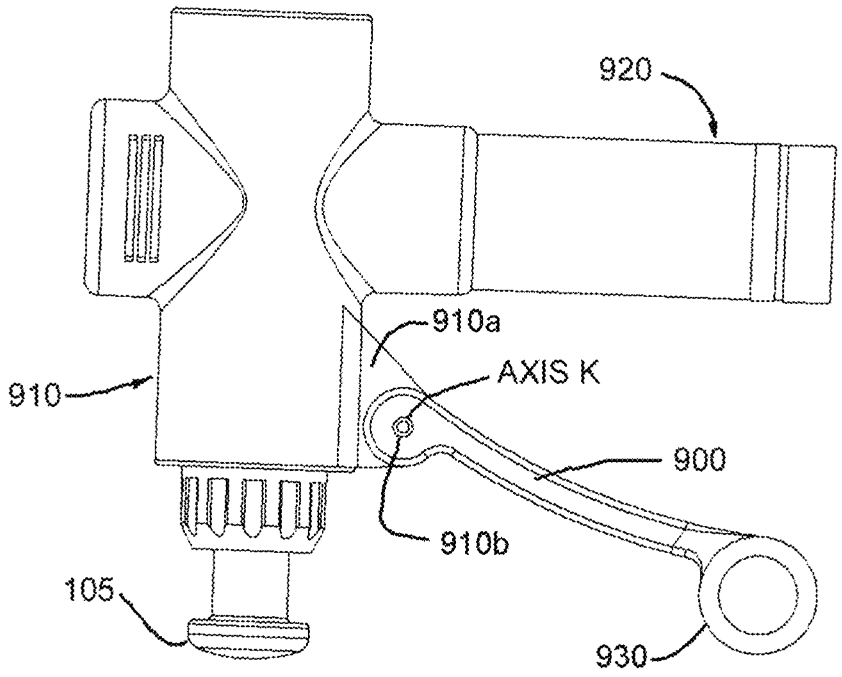
FIG. 16 is a side elevational view of the massage gun of FIG. 15.

FIG. 15 shows an isometric view of another embodiment whereupon the focusing rest 900 is pivotable about an axis K which is attached to an extension 910*a* of the massage gun housing 910. The axis K is orthogonal to the axis of the movement of the massage head 105. FIG. 16 is a side elevational view of the massage gun shown in FIG. 15 and shows the relative locations of the massage head 105 and the focusing rest cushion 930 at the distal end of the focusing rest 900.

Figure 17:
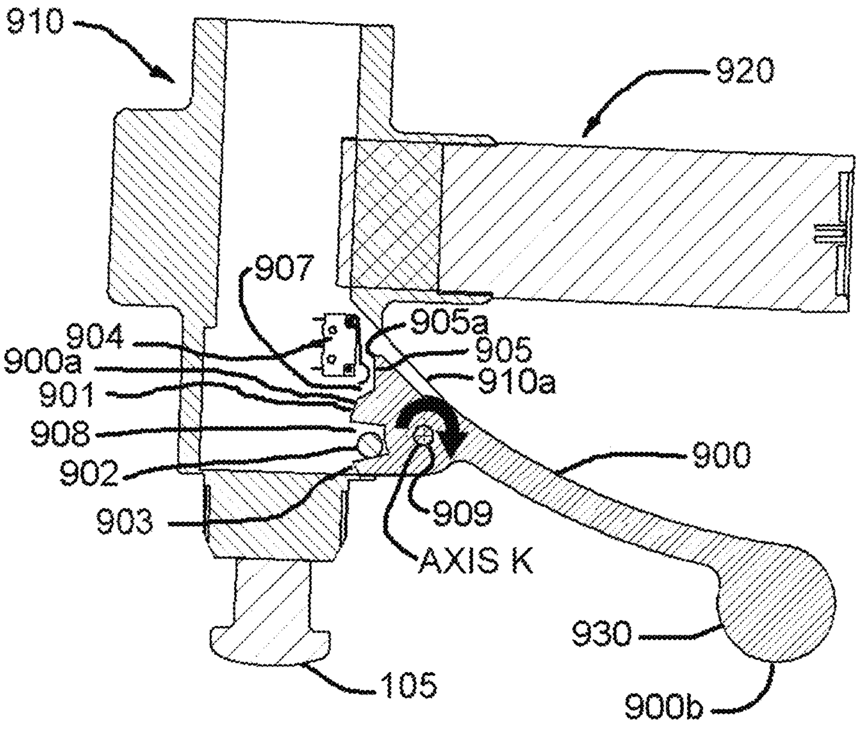
FIG. 17 is a section view through the center of FIG. 16 which shows the orientation of an internal microswitch which is activated by the slight pivoting motion of the focusing rest.

FIG. 17 is a section view of the side elevational view shown in FIG. 16. The pivoting focus rest 900 has a proximal end 900*a* and a distal end 900*b*. At the distal end 900*b* of the focus rest 900 is a focusing rest cushion 930. At the proximal end 900*a* are teeth 901, 903, 905. The teeth 901, 903, 905 of the proximal end 900*a* are received within a cavity 910*b* of an extension 910*a* of the massage gun housing 910.

The first tooth 905 and the second tooth 901 define a first gap 907, with the first tooth 905 having a flat surface 905*a* that can interact with a microswitch 904. Between the second tooth 901 and the third tooth 903 is a second gap 908 which can receive a stop stud 902 present within the cavity 910*b* of the extension 910*a* of the massage gun housing 910. Second tooth 901 and third tooth 903 of the focusing arm 900 allow limited movement adjacent to a stop stud 902. A relatively strong torsion spring (not shown) is mounted along the axis K and biases the focusing rest 900 is the direction as shown by the arrow. In this position, the massage gun is self-standing when not being used, and the third tooth 903 is biased against the stop stud 902.

Near the proximal end 900*a* of the focus rest 900 is a bore 931 which receives a pin or other element 909 in which the focus rest 900 can pivot. The pin 909 is additionally received by the cavity 910*b* of the extension 910*a* of the massage gun housing 910.

This view demonstrates how the pivoting focusing rest 900 may be used to activate an internal microswitch 904. Slight initial movement of the focus rest 900 or pressure applied to the distal end 900*b* of the focus rest 900 causes the focus rest 900 to pivot relative to the K axis, such that the flat surface 905*a* of the first tooth 905 at the proximal end 900*a* of the focus rest 900 applies pressure to the microswitch 904. The microswitch 904, once activated via pressure, initiates the motor (not shown) to move the massage head 105. In this way, the focusing rest 900 is used as an automatic trigger to initiate the reciprocating motion of the massage head 105, and battery power is automatically conserved when the pressure is removed from the focus rest 900 of the massage gun. This arrangement may also allow the removal of the power switch 107 at the end of battery housing as shown in FIG. 2. The focusing arm 900 thus provides the dual role of stabilization and trigger for initiating the reciprocating motion of the massage head 105 of the massage gun.

During use, the user grasps the cylindrical housing 920. Upon putting pressure upon the distal end 900*b* of the focusing rest 900, the pivoting movement causes the focus rest 900 to rotate through a small angle about axis K on pin 909 until the second tooth 901 contacts the stop stud 902. Simultaneously, the first tooth 905 via the flat surface 905*a* contacts the microswitch 904 which closes the massage motor circuit and initiates the reciprocation of the massage head 105. When the user discontinues or relieves the massage pressure, the torsion spring (not shown) rotates the focusing rest 900 in the direction of the arrow until the third tooth 903 contacts the stop stud 902. Simultaneously, the first tooth 905 releases the microswitch 904 and thus shuts off power to the motor of the massage gun.

Figure 18:
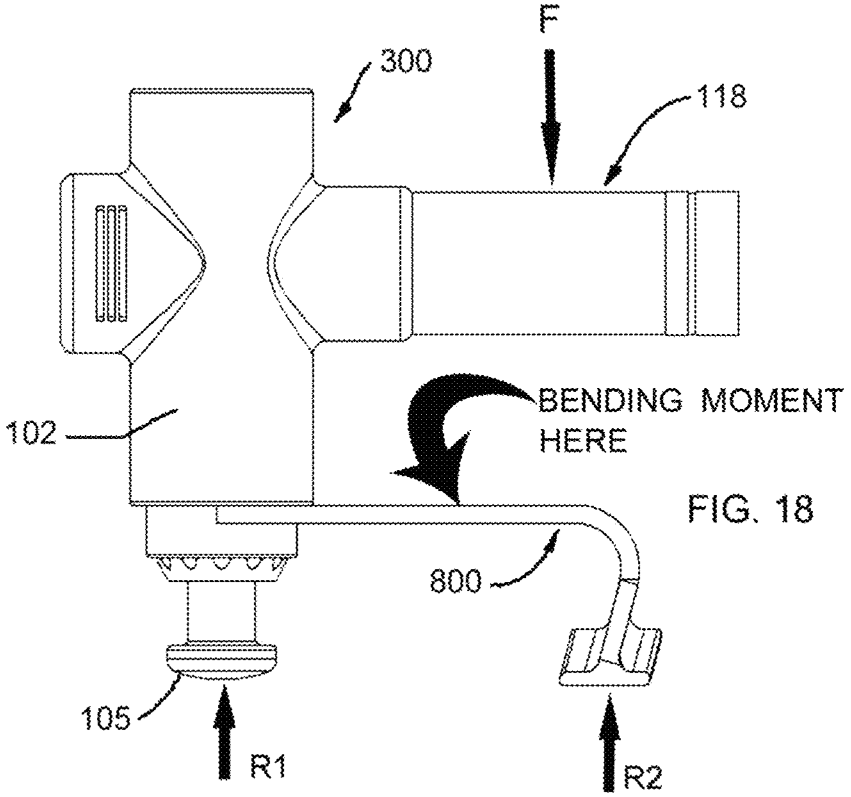
FIG. 18 is a side elevation view of the massage gun of FIG. 14 showing the location of a bending moment in the beam portion of an attachment.
Figure 19:
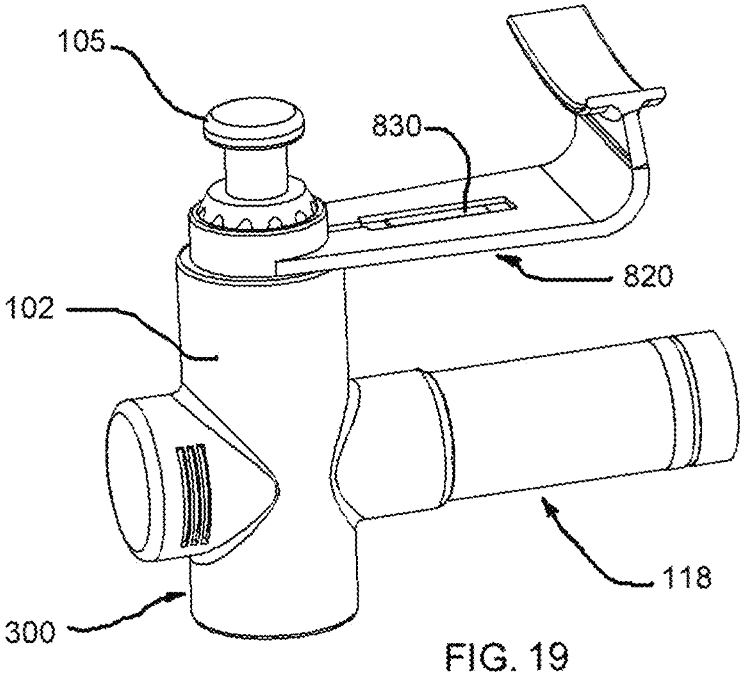
FIG. 19 is a view of the massage gun of FIG. 14 looking from the working side of the device and showing the location of a strain gauge.

FIG. 18 shows a side elevational view of the massage gun and focus rest attachment 800 as previously shown in FIG. 14. The figure shows the reaction vectors R1 and R2 which result from the user applying downward pressure on the massage gun and attachment when grasping the handle 118 at the location represented by downward vector F. The resulting vectors create a bending moment across the span of the focus rest attachment 800 as shown in the diagram. A strain gauge can be attached at that location to sense the pressure applied by the user. Such a strain gauge 830 is shown mounted on the underside of the leg 820 of the focus rest attachment 800 in FIG. 19. When the user applies pressure to the massage gun handle 118, the strain gauge 830 is used to provide feedback and aid in controlling initiation of the motor of the massage gun.

In this way, the focusing rest attachment 800 is used as an automatic trigger to initiate the reciprocating motion of the massage head 105. This is advantageous because battery power is automatically conserved when the pressure is removed from the massage gun. This arrangement may also allow the removal of the power switch 107 at the end of battery housing as shown in FIG. 2. The focusing arm attachment 800 thus provides the dual role of stabilization and trigger for initiating the reciprocating motor motion.

Figure 20:
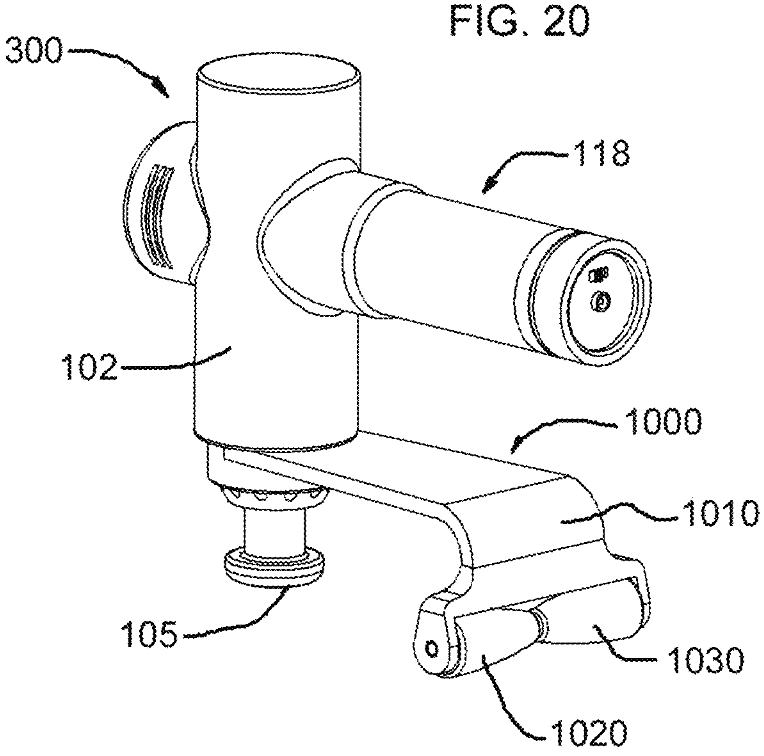
FIG. 20 is a is an embodiment of the massage gun attachment whereupon rolling elements are mounted at the contact surface of the focusing rest.

FIG. 20 shows an embodiment in which two tapered rolling elements 1020 and 1030 are placed at a contact surface of the focusing rest 1000. A rolling element may be added at the contact surface of the focusing rest in any of the embodiments described previously, at the distal end of the focus rest. Attachment 1000 has a focusing rest extension 1010 in which the distal end 1010*a* includes a pivot shaft 1011 and rollers 1020 and 1030, each of which have an outer diameter with tapered profiles, and can rotate relative to the pivot shaft 1011. This arrangement facilitates a massage motion as the user migrates the massage path along an axis of a limb. The tapered profile has a first end with an outer diameter that has a reduced thickness or smaller diameter than a second end.

Figure 21:
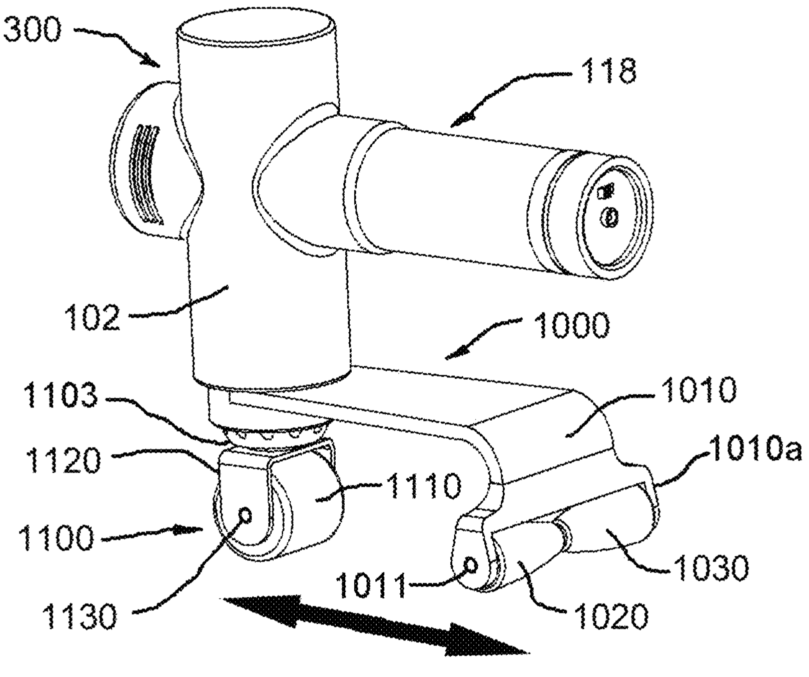
FIG. 21 is an embodiment of the massage gun utilizing the focusing attachment of FIG. 20 with the addition of a rolling element mounted on the percussion head.

A smoother reciprocating massage motion can be achieved by adding a rolling element directly onto the massage shaft 1103 of the massage gun as shown in FIG. 21. This figure shows a massage head attachment 1100 which is snapped onto the massage shaft 1103 in lieu of massage head 105 (FIG. 20). The rolling element massage head 1100 consists of a bearing frame 1120 which receives a bearing shaft 1130 and a rolling element 1110. The arrows show the natural direction of the reciprocating motion. Such an arrangement can be useful for moving the massage gun back and forth along the axis of the spine when massaging a person's back muscles. This arrangement may also utilize the automatic control of the massage motor based upon user pressure as explained in FIG. 19 above.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A percussive massage gun for use by a user on a muscle comprising:
- a main body defining a cavity and a single handle portion extending therefrom, the single handle portion configured to be graspable by the user for operating the percussive massage gun with one hand;
- a motor-driven piston reciprocating along an axis, having a first end received within the cavity of the main body and a second end for mounting a percussive massage head therefrom;
- a focusing rest rigidly adjoined to the main body at a proximal end of the focusing rest and possessing a pivot shaft fixedly adjoined to the focusing rest at a distal end, the focusing rest having an axis parallel to an axis of the single handle portion and noncoincident with the axis of the motor-driven piston;
- a first roller mounted upon the pivot shaft and freely rotatable thereon;
- a second roller mounted upon the pivot shaft and freely rotatable thereon;
- a bearing shaft rigidly adjoined to the motor-driven piston having an axis that is parallel to the pivot shaft and perpendicular to the axis of the motor-driven piston; and
- a third roller mounted upon the bearing shaft and freely rotatable thereon;
- wherein spacing amongst the first roller, the second roller and the third roller is proportioned to provide a self-standing tripod suspension which maintains the axis of the motor-driven piston substantially perpendicular to a fascia surface of the muscle absent a grasp of the user;
- wherein each of the first roller, the second roller and the third roller are self-supporting and each configured to maintain rolling contact upon the fascia surface of the muscle as the motor-driven piston reciprocates and the user traverses the percussive massage gun along the fascia surface of the muscle with the one hand.

2. The percussive massage gun of claim 1, wherein the first roller and the second roller have a conical outer surface.

3. The percussive massage gun of claim 1, wherein the first roller is adjoined to the second roller.

4. An apparatus for activating a handheld percussive massage gun while operably positioned upon a fascia surface, the apparatus comprising:
- a massage gun comprising:
  - a motor-driven piston reciprocating along an axis with a distal end for oscillating against the fascia surface,
  - a housing comprising:
    - a first portion surrounding the motor-driven piston;
    - a second portion comprising a handle configured to be graspable by a user, the second portion having an axis that is noncoincident with the axis of the motor-driven piston;
    - a third portion projecting from the housing comprising a focusing rest rigidly adjoined to the housing at its proximal end and having a distal end configured to be in supporting contact with the fascia surface, the focusing rest maintaining the massage gun in a self-standing orientation with an axis of the focusing rest substantially perpendicular to the fascia surface absent a grasp of the user;
    - a strain gauge mounted on the focusing rest having a sensor output conditioned by an electronic circuit to switch on power to the motor-driven piston when the focusing rest experiences a bending moment greater than or equal to a bending moment threshold, the bending moment threshold configured to be achieved when the user applies mild pressure on the fascia surface with the massage gun via the handle, thereupon activating the motor-driven piston;
    - whereupon release of the mild pressure on the fascia surface with the massage gun via the handle, no longer meets the bending moment threshold, automatically deactivating the power to the motor-driven piston.

5. The apparatus of claim 4, wherein the distal end of the focusing rest has a concave curvilinear surface for tangential mating contact with curvilinear fascia of the fascia surface.

6. An apparatus for activating a handheld percussive massage gun while operably positioned upon a fascia surface, the apparatus comprising:
- a massage gun comprising:
- a motor-driven piston reciprocating along an axis with a distal end for oscillating against the fascia surface;
  - a housing comprising:
    - a first portion surrounding the motor-driven piston;
    - a second portion comprising a handle configured to be graspable by a user and having an axis that is noncoincident with the axis of the motor-driven piston;
  - a third portion projecting from the housing and comprising a focusing rest hingedly adjoined to the housing at its proximal end and having a distal end configured to be in supporting contact with the fascia surface, the focusing rest configured to maintain the massage gun in a self-standing orientation with the axis of the motor-driven piston substantially perpendicular to the fascia surface absent a grasp of the user and limited rotation between a first radial position and a second radial position, the focusing rest comprising a toothed actuator projection in contact with a microswitch located within the housing at the first radial position, the first radial position configured to be achieved when the user of the massage gun applies mild pressure upon the handle and directed toward the fascia surface to overcome a spring force of a spring;

whereupon the spring is configured to restore the focusing rest to the second radial position when the user relieves the mild pressure upon the handle, thereupon automatically deactivating the motor-driven piston.

7. The apparatus of claim 6, wherein the distal end of the focusing rest has a concave curvilinear surface for tangential mating contact with a curvilinear portion of the fascia surface.

8. A method of actuating a motor driven piston of a percussive massage gun comprising a support beam sensor, the method comprising the steps of:

grasping a handle of the percussive massage gun with one hand;

applying mild pressure in a direction of a fascia surface with the one hand while the percussive massage gun rests upon the fascia surface, wherein applying the mild pressure in the direction of the fascia surface actuates a switch within a focusing rest attached to the handle by interaction of a toothed actuator projection with the switch, and wherein voltage is applied to start a motor of the motor driven piston, following actuation of the switch.

9. A method of applying percussive massage to a fascia surface using a self-standing massage gun comprising a motor-driven piston, the method comprising the steps of a user:

resting rollers of the massage gun upon a fascia surface in its self-standing position, wherein the self-standing position is maintained with the rollers contacting the fascia surface;

activating the motor-driven piston;

grasping a handle of the self-standing roller supported massage gun with a single hand;

applying mild pressure toward the fascia surface; and rolling the massage gun along the fascia surface in reciprocating strokes while maintaining the self-standing position with the single hand.

* * * * *